UNITED STATES PATENT OFFICE.

RUDOLF BURCKHARDT, OF BASEL, SWITZERLAND, ASSIGNOR TO DURAND & HUGUENIN LTD., OF BASEL, SWITZERLAND.

BASIC YELLOW-RED DYESTUFFS OF THE SAFRANIN SERIES AND PROCESS OF MAKING SAME.

1,174,820.     Specification of Letters Patent.     Patented Mar. 7, 1916.

No Drawing.     Application filed March 4, 1915. Serial No. 12,098.

*To all whom it may concern:*

Be it known that I, RUDOLF BURCKHARDT, a citizen of the Swiss Republic, and resident of Basel, Switzerland, have invented new Basic Yellow-Red Dyestuffs of the Safranin Series and a Process of Making Same, of which the following is a full, clear, and exact specification.

I have found that new basic yellow-red dyestuffs of the safranin series are obtained by condensing a nitrosomonoalkyl-orthotoluidin with a metaminoalkyl-paratoluidin. These new dyestuffs dissolve in concentrated sulfuric acid to green solutions turning on addition of water first to blue and afterward to red. They give on cotton yellow-red prints and dye with tannin mordanted cotton yellow-red tints.

Example: In a vessel provided with a stirrer and a reflux cooler are mixed the solutions of 82 kilograms nitrosoethylorthotoluidin in 450 liters alcohol and of 50 kilograms ethylmetatoluylenediamin in 450 liters alcohol with 54 kilograms hydrochloric acid of 33 per cent. and slowly heated to boiling. Almost simultaneously with the mixing of the substances the reaction begins; the color changes toward green and then passes over blue-violet gradually into red. After a boiling for 2 hours, no further nitroso compound can be detected in the reaction product, the heating is suspended and after cooling the dyestuff crystallizes in form of green-golden needles. The coloration of its solution in concentrated sulfuric acid is green and turns on addition of water first to blue and afterward to red.

The dyestuff corresponds to the formula

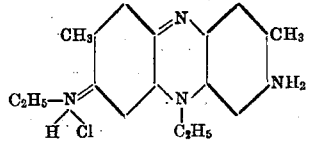

In an analogous manner can be prepared the dyestuffs resulting from the condensation of nitroso-ethylorthotoluidin with methyl-meta-toluylenediamin or of nitrosomethylorthotoluidin with ethylmetatoluylenediamin or with methylmetatoluylenediamin.

All four dyestuffs give on cotton yellow-red prints and on tannin mordanted cotton yellow-red dyeings.

The same dyestuffs can be prepared by oxidizing together methylparatoluylenediamin or ethylparatoluylenediamin with methylmetatoluylenediamin or ethylmetatoluylenediamin.

What I claim is:

1. The described process for the manufacture of yellow-red dyestuffs of the safranin series consisting in condensing a nitrosoalkylorthotoluidin with a metaaminoalkylparatoluidin.

2. The described process for the manufacture of yellow-red dyestuffs of the safranin series consisting in condensing a nitrosoethylorthotoluidin with a metaaminoalkylparatoluidin.

3. The described process for the manufacture of yellow-red dyestuffs of the safranin series consisting in condensing a nitrosoalkylorthotoluidin with metaaminoethylparatoluidin.

4. The described process for the manufacture of yellow-red dyestuffs of the safranin series consisting in condensing a nitrosoethylorthotoluidin with metaaminoethylparatoluidin.

5. As new products, the described yellow-red dyestuffs of the safranin series resulting from the condensation of a nitrosoalkylorthotoluidin with a metaamino-alkylparatoluidin, dissolving in concentrated sulfuric acid to green solutions turning on addition of water first to blue and afterward to red and giving on cotton yellow-red prints and on tannin mordanted cotton yellow-red dyeings.

6. As a new article of manufacture the described yellow-red dyestuff of the safranin series derived from nitrosoethylorthotoluidin and metaaminoethylparatoluidin, dissolving in concentrated sulfuric acid to green solutions turning on addition of water first to blue and afterward to red and giving on cotton yellow-red prints and on tannin mordanted cotton yellow-red dyeings.

In witness whereof I have hereunto signed my name this 16th day of February, 1915, in the presence of two subscribing witnesses.

DR. RUDOLF BURCKHARDT.

Witnesses:
ARNOLD ZUBER,
AMAND RITTER.